United States Patent

[11] 3,629,851

[72] Inventor Ulrich Werner
Glen Ellyn, Ill.

[21] Appl. No. 868,170
[22] Filed Oct. 21, 1969
[45] Patented Dec. 21, 1971
[73] Assignee Bell Telephone Laboratories Incorporated
Murray Hill, Berkeley Heights, N.J.

[54] SCANNER CONTROL CIRCUIT FOR A PROGRAM-CONTROLLED COMMUNICATION SWITCHING SYSTEM
9 Claims, 8 Drawing Figs.

[52] U.S. Cl. .......... 340/172.5
[51] Int. Cl. .......... G06f 15/16, G06f 13/00
[50] Field of Search .......... 340/172.5; 179/18

[56] References Cited

UNITED STATES PATENTS 3,274,561 9/1966 Hallman .......... 340/172.5
3,408,628 10/1968 Brass et al. .......... 340/172.5
3,483,524 12/1969 De Buck .......... 340/172.5

*Primary Examiner*—Raulfe B. Zache
*Assistant Examiner*—R. F. Chapuran
*Attorneys*—R. J. Guenther and R. B. Ardis

ABSTRACT: A program-controlled telephone switching system which includes a main processor which serves to control the system's switching network and to process data obtained by the main processor and data obtained by an auxiliary processor. The auxiliary processor comprises a control unit and a memory which is directly shared by the main processor and the auxiliary processor. The auxiliary processor operates in accordance with programs and data placed in the shared memory by the main processor and by means of such programs and data examines the lines and trunks of the system to detect significant changes which are indicative of a request for attention by a line or trunk. Upon detection of a significant condition, the auxiliary processor places a record in the shared memory which identifies the line or trunk which has experienced a significant change.

INVENTOR
W. ULRICH
BY John C Albrecht
ATTORNEY

| BIT POSITIONS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| SCANNER ANSWER WORD ROW N IN REGISTER 312 | 0 | 0 | 0 | 1 | 1 | 1 | 0 | 0 | 1 | 1 | 0 | 0 | 1 | 1 | 1 | 0 |
| "OR" BITS (0-15 ONLY) | | | | | | | | | | | | | | | | |
| LAST LOOK WORD ROW N OBTAINED FROM MEMORY 250 AND STORED IN REGISTER 601 | 0 | 1 | 1 | 0 | 0 | 0 | 1 | 1 | 0 | 0 | 1 | 0 | 1 | 0 | 1 | 0 |
| | 0 | 1 | 1 | 1 | 1 | 1 | 1 | 1 | 1 | 1 | 1 | 0 | 1 | 1 | 1 | 0 |
| COMPLEMENT | | | | | | | | | | | | | | | | |
| SERVICE REQUEST WORD FORMED IN LOGIC CIRCUIT 610 | 1 | 0 | 0 | 0 | 0 | 0 | 0 | 0 | 0 | 0 | 0 | 1 | 0 | 0 | 0 | 1 |
| "AND" | | | | | | | | | | | | | | | | |
| LINE LOAD CONTROL MASK WORD PREVIOUSLY OBTAINED FROM MEMORY AND STORED IN REGISTER 609 | 1 | 0 | 0 | 0 | 0 | 0 | 0 | 0 | 0 | 0 | 0 | 0 | 0 | 0 | 0 | 0 |
| LINE LOAD CONTROL SERVICE REQUEST WORD FORMED IN LOGIC CIRCUIT 610 | 1 | 0 | 0 | 0 | 0 | 0 | 0 | 0 | 0 | 0 | 0 | 0 | 0 | 0 | 0 | 0 |

SCANNER CONTROL CIRCUIT FOR A PROGRAM-CONTROLLED COMMUNICATION SWITCHING SYSTEM

BACKGROUND OF THE INVENTION

1. Field of the Invention

This invention is concerned with a data processing system which comprises a program-controlled main processor and a program-controlled auxiliary processor. The auxiliary processor is employed to preprocess input information to the system. Such arrangements are of particular interest to real-time data processing systems serving large numbers of input information sources.

2. Description of the Prior Art

The processing capacity or "throughput" of a data processing system is directly related to the response times of the system elements (e.g., the bulk memories, the processor circuitry, the input devices, etc.). Thus, increased throughput requirements can be met by improving the response times of the system elements. Such measures, however, can be quite costly and, furthermore, there are physical limits to the improvements which can be achieved. A telephone switching system is an illustrative example of a data processing system wherein real-time service must be provided for the many lines and trunks served by the system and wherein rapidly changing input information may be generated by such lines and trunks. There are data processing systems in which all of the system work is achieved by a single main processor and there are other systems in which a plurality of identical processors serve input demands in parallel. In still another system an auxiliary processor is attached to a main processor as though the auxiliary processor were a memory of the main processor and the auxiliary processor, in turn, is connected to a memory which is shared by the main processor and the auxiliary processor. The shared memory can be directly addressed only by the auxiliary processor. However, the auxiliary processor caN be controlled by the main processor to read information from and write information into the shared memory.

SUMMARY OF THE INVENTION

In accordance with this invention an independent auxiliary processor is employed to detect requests for service from the lines and trunks served by the illustrative telephone switching system and information relevant to each detected request for service is stored in a defined range of memory addresses which can be directly accessed by both the main processor and the auxiliary processor.

It is an object of this invention to reduce the real-time processing demand on the central data processor of a communication switching system.

In the copending application of J. A. Harr et al. Ser. No. 685,600 filed Nov. 24, 1967, now U.S. Pat. No. 3,517,123 which is a division of A. H. Doblmaier et al. Ser. No. 334,875 filed Dec. 31, 1963, now U.S. Pat. No. 3,570,008, issued Mar. 9, 1971 there is disclosed a telephone switching system. In this copending application a single main processor, similar to the main processor in accordance with the present invention, controls the scanning of lines and trunks served by the system to detect all input information originating with such lines and trunks.

In accordance with one feature of this invention, an auxiliary processor cooperates with the main processor to accomplish the routine scanning of lines, trunks, and junctors to detect requests for service and disconnects. The main processor controls scanning for the purpose of gathering information from the lines and trunks from which a request for service has been priorly detected by the auxiliary processor.

It is another object of this invention to share the system input-output circuits between the main processor and the auxiliary processor in a manner which precludes substantial interruption or interference with main processor functions by the auxiliary processor.

In accordance with another feature of this invention the auxiliary processor monitors the operation of the main processor to detect the occurrence of main processor machine cycles in which the main processor does not require access to either the input-output circuits or to the temporary memory.

In accordance with another feature of this invention, the auxiliary processor employs the same operating machine cycle as the main processor and operates synchronously with the main processor.

It is another object of this invention to increase the flexibility of the auxiliary processor through program control of that processor.

In accordance with another feature of this invention, the information which is read from a shared temporary memory by the auxiliary processor includes a data portion and an instruction portion. Advantageously, therefore, it is possible to readily scan lines, trunks, and junctors routinely although the scanning of each of these requires a discrete and different processing format.

The above and other objects and features of this invention can be more readily understood by reference to the following description of the drawing in which.

Figure 1:
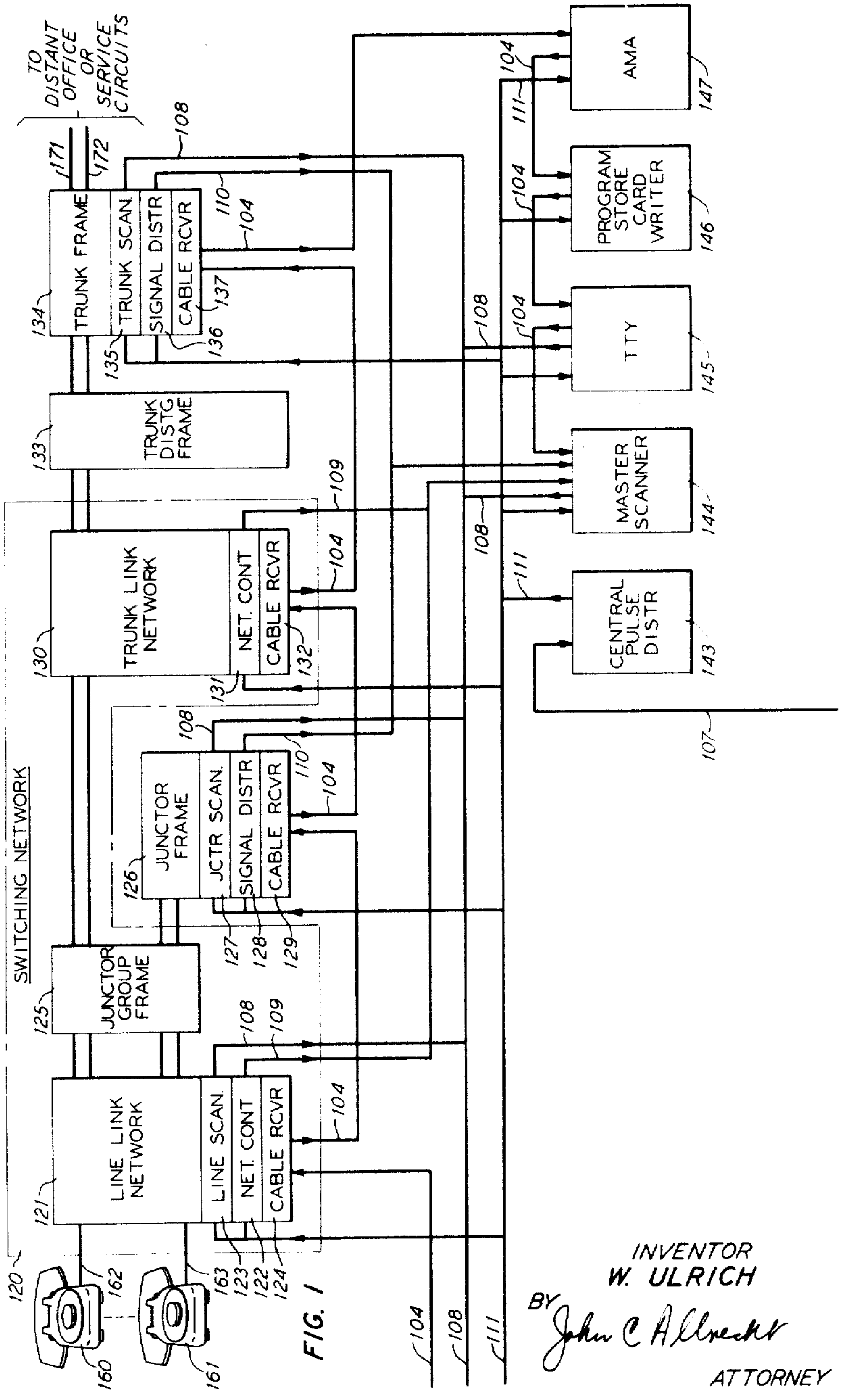
FIG. 1 is a block diagram of the principal input-output circuits of the illustrative communication switching system.
Figure 2:
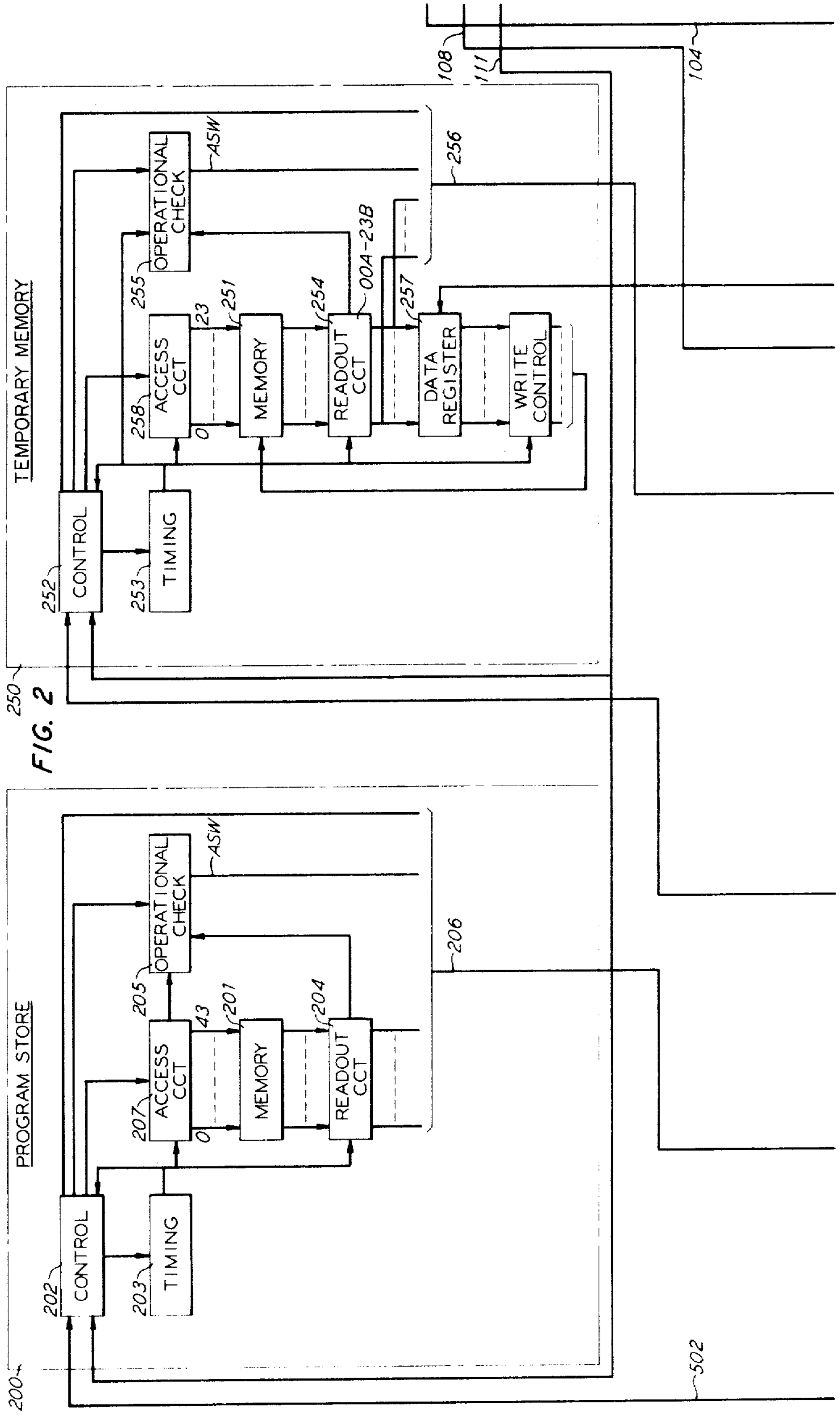
FIG. 2 is a block diagram of the memory system which comprises a program memory and a temporary memory for the main processor.

The telephone switching system of FIGS. 1 through 6 is an illustrative example of a program-controlled, real-time data processing system. The primary function of the telephone switching system is the interconnection of the lines 162, 163 and the trunks 171, 172 of the system in accordance with call-signaling information. Call-signaling information includes all signals which originate in equipments which terminate the lines and the trunks. Illustratively, telephone on-hook to off-hook transitions are indicative of a service request. Also, telephone off-hook to on-hook transitions are indicative of a call termination. A switch-hook flash during the course of an established call connection is an indication of a desire for further attention during the course of the call. For example, a switch-hook flash may indicate a desire to effect a dial transfer or to add a party to the connection. Other signals such as dial pulses, TOUCH-TONE, multifrequency signals, and voice signals are used to indicate the desired destination of a call.

An example of a program-controlled communication switching system wherein call-signaling information is gathered and processed by a program-controlled data processor is described in the copending application. In prior known systems (e.g., Doblmaier et al. Ser. No. 334,875, which was filed on Dec. 31, 1963), a single high-speed data processor controls a large number of scanning circuits in accordance with various program sequences to gather the call-signaling input information. The information so obtained is merged with information obtained from a temporary memory. The information in the temporary memory relates to the states of the lines and trunks as determined by prior scanning of these lines and trunks. The merging of the input information from the scanner and the information from the temporary memory results in the generation of data words which may be interpreted to detect significant changes in input information. These significant changes include the previously enumerated changes which are indicative of request for service, hangup, and the arrival of new call destination information.

Call-signaling information originates in a completely random fashion from the lines and trunks in the system. The data processor must be capable of recognizing all significant changes in call-signaling information which originate from a line or a trunk. Much of the call-signaling information, namely, the scanning of lines and trunks to detect request for service, hangup, and switch-hook flashes, may be gathered by scanning each line and trunk routinely at time intervals calculated to permit recognition of such signals. This routine scanning function in a large communication switching system (e.g., an office having 30,000 lines and 8,000 trunks) may require as much as 25 percent of the real-time data processing capacity of a processor.

EQUIPMENT DESCRIPTION

In the illustrative switching system, the Switching Network 120 serves to selectively interconnect the lines, trunks and service circuits which terminate on the network. Two-wire paths are provided through the network of this one specific illustrative embodiment; however, a two-wire network is shown as a matter of convenience only and four-wire paths could equally as well be provided between specific network terminals.

The makeup of this network and the control thereof are more fully described in the following patents: A. Feiner, U.S. Pat. No. 3,257,513, issued June 21, 1966; K. S. Dunlap et al. U.S. Pat. No. 3,281,539, issued Oct. 25, 1966; T. N. Lowry, U.S. Pat. No. 3,231,679, issued Jan. 25, 1966.

The Switching Network 120 provides communication paths and means for establishing supervising such paths. The Central Processor, which comprises the Central Control 100 and the Memories 200, 250 of FIG. 2, maintains a record (Network Memory Map) of the busy and idle states of all network links and a record of the makeup of every established or reserved path through the network in the Temporary Memory 250. The Central Processor interprets requests for connections between specific pieces of equipment and determines a free path through the network by examining the connection requirements and the above-noted busy-idle states of the possible paths.

The network is divided into two major portions, namely, line link networks which terminate lines and junctors (both wire junctors and junctor circuits); and the trunk link networks which terminate trunks, wire junctors and service circuits such as tone circuits, signal receivers, signal transmitters, etc.

Certain junctor terminals of each line link network are connected directly through wire junctors (a pair of wires without other circuit elements) to certain junctor terminals of the trunk link networks; others of the line link network junctor terminals are interconnected by way of junctor circuits (which provide talking battery and call supervision facilities).

Junctor terminals of a trunk link network which are not connected to junctor terminals of a line link network are directly interconnected by wire junctors.

Control of the network and the control and supervision of the elements connected to the network are distributed through a number of control and supervisory circuits. The principal control and supervisory elements are:

1. The network control circuits which accept commands over Command Bus 104 from the Main Processor of FIGS. 3 through 6 and, in response to such commands, selectively establish portions of a selected path through the network or, in response to such commands, execute particular test or maintenance functions.

2. The network scanners which comprise a ferrod scanning matrix to which system elements such as lines, trunks and junctor circuits are connected for purposes of observing the supervisory states of the connected elements. The scanners, in response to commands from the Main and Auxiliary Processors transmit indications of the supervisory states of a selected group of circuit elements to the Main and Auxiliary Processor, respectively.

3. The network signal distributors which, in response to commands from the Main Processor, provide an operate or a release signal on a selected signal distributor output terminal which is termed herein a signal distributor point. A signal of a first polarity is an operate signal and a signal of the opposite polarity is a release signal. Signal distributor output signals are employed to operate or release control relays in junctor circuits, trunk circuits, and service circuits. A magnetically latched wire spring relay is used generally throughout the junctor circuits and trunk circuits for purposes of completing the transmission paths through these elements and for circuit control in general. The network signal distributors are relatively slow-operating devices in that they comprise pluralities of relays. Signal distributor output signals are pulsed signals and a single signal distributor can be addressed to only one of its output points at any given instant.

Of the three above-noted network control and supervisory elements (there are pluralities of each of these) the network controllers and the signal distributors are relatively slow-operating devices and to assure completion of a task, each of these devices is addressed at a maximum repetition rate of once every 25 milliseconds. This period of time is sufficient to assure completion of the work function associated with a network controller or signal distributor command. Therefore, there is no need for the Main Processor to monitor these devices to assure completion of their assigned tasks before transmitting a subsequent command to the same controller. The network scanners, however, are relatively fast-operating devices and these may be addressed at a maximum rate of once every 11 microseconds.

SUBSCRIBER CIRCUITS

The subscriber sets such as 160, 161 are standard sets such as are employed with present day telephone switching systems. That is, these are sets which connect to the central office via a two-wire line, respond to normal 20-cycle ringing signals and may be arranged to transmit either dial pulses or TOUCH-TONES or may be arranged for manual origination. Subscriber stations comprising one or more subscriber sets such as 160, 161 all terminate at line terminals of a line link network. A single subscriber line may have combinations of TOUCH-TONE and dial pulse sets. Information concerning the type of call-signaling apparatus associated with a subscriber's line is included in a class of service mark which is maintained normally in the Program Store 200 however, after a recent change this information is found in whole or part in the Call Store 250.

CALL-PROCESSING

As previously stated, the interconnection of the lines and the trunks of a communication switching system is in accordance with call-signaling information obtained from the lines and trunks. Certain call-signaling information may be gathered by means of routine sequential scanning procedures while other call-signaling information must be gathered by directed scanning (i.e., scanning equipment out of sequence). In accordance with this invention, an auxiliary processor is responsible for routine scanning functions while the main processor is responsible for directed scanning functions and for both the interpretation of and reaction to significant changes which are detected by the auxiliary processor. In the prior noted copending application of Dablmaier et al. the main processor performs both routine and directed scanning functions. In U.S. Pat. No. 3,408,628 issued Oct. 29, 1968, there is shown a communication switching system which comprises a main processor and an auxiliary processor which is connected to the main processor as though the auxiliary processor were a temporary memory. This auxiliary processor is arranged to perform routine input and output functions under the direct control of the main processor and under the control of program sequences which are discrete to the auxiliary processor. These sequences are stored in a memory which is under the direct control of the auxiliary processor and the indirect control of the main processor.

The auxiliary processor of the present application is concerned only with routine scanning functions required by the system, shares the temporary memory with the main processor, and is only indirectly controlled by the main processor.

Figure 3:
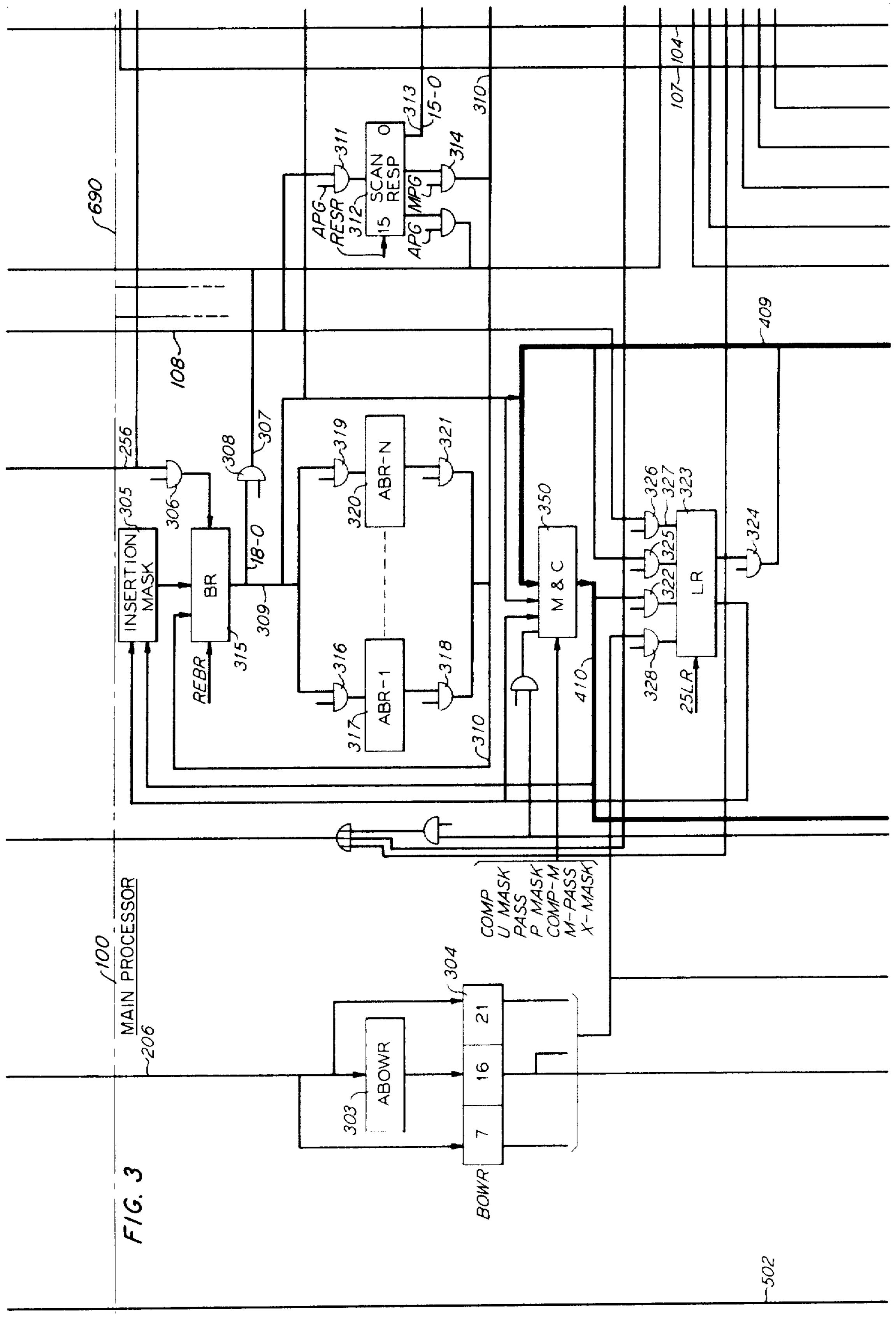
FIGS. 3 through 5 illustrate the main processor.
Figure 4:
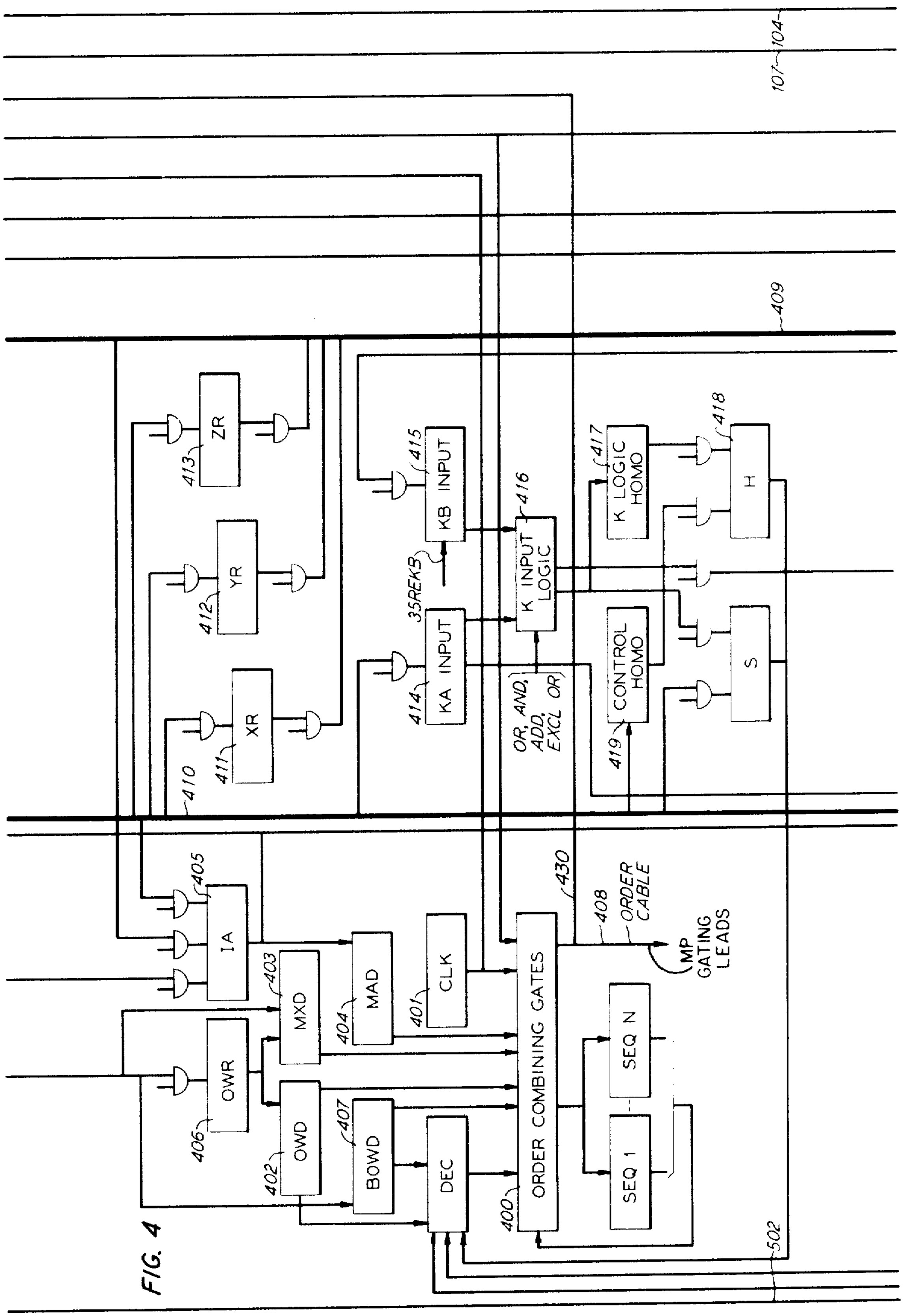
Figure 5:
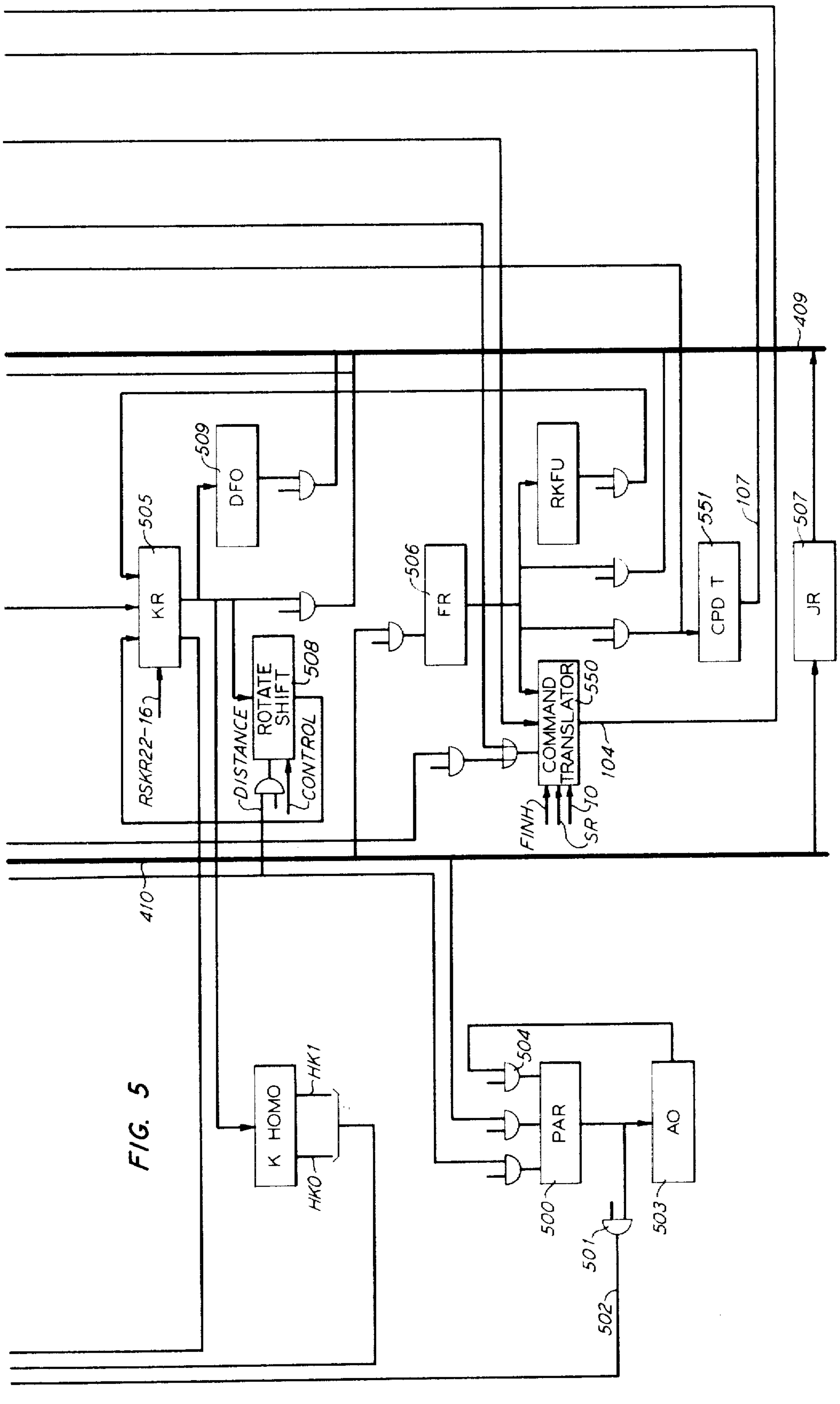

The main processor is shown schematically in FIGS. 3, 4, and 5. For the purpose of this discussion, the main processor may be divided into two basic portions:

1. Data processing facilities;

2. Facilities for communicating with the input-output devices of FIG. 1, the memory arrangement of FIG. 2, and the auxiliary processor of FIG. 6.

The main processor performs system data processing functions in accordance with sequences of program order words which are stored, for the main part, in the Program Memory 200. In a few specialized instances, sequences of program orders for maintenance purposes are obtained from the Temporary Memory 250. The program order words are arranged within the memories in ordered sequences which are calculated to implement the call-processing and maintenance functions of the communication switching system. The program orders comprise both decision orders and nondecision orders.

Decision orders are generally employed to initiate desired actions in response to significant changes from the input circuits of the system or in response to indicated system conditions which require maintenance actions. Decision orders dictate that a decision shall be made in accordance with certain observed conditions, and the result of the decision causes the main processor to advance to the next order of a current sequence of order words or to transfer to an order in another sequence of order words. Decision orders are also termed conditional transfer orders.

Nondecision orders are employed to communicate with the input and output units and the memory arrangement, to both move data from one location to another within the main processor, and to logically process the data in accordance with instructions contained in the nondecision order. For example, the main processor is arranged to merge two data words by the logical functions of AND, OR, EXCLUSIVE-OR, etc. Further data may be complemented, shifted, and rotated.

Upon completion of the actions required by most nondecision orders, the main processor executes the next order in the current sequence of order words. A few nondecision orders are termed "unconditional transfer orders" and these indicate that a transfer shall be made from the current sequence of order words to another specified sequence of order words without benefit of a decision.

The sequences of order words are intended to be executed serially in time. The processing of data within the main processor is on a purely logical basis; however, ancillary to the logical operations, both the main processor and the auxiliary processor perform certain minor arithmetic functions. The arithmetic functions are generally not concerned with the processing of data, but rather are primarily employed in the process of fetching new data from the memories or from the scanners of the input arrangement of FIG. 1.

The main processor, in accordance with order word sequences obtained from the memory arrangement, processes data obtained by its own actions (e.g., directed scanning) and data obtained by the input arrangement, interprets the results of such processing, and generates and transmits signals for the control of the units of the input-output arrangement and the memory arrangement.

The main processor comprises:

a. A plurality of multistage flip-flop registers;

b. A plurality of decoding circuits for interpreting the program order words;

c. A plurality of private bus systems for communicating data between various elements of the main processor;

d. A plurality of receiving circuits for accepting input information from a plurality of sources;

e. A plurality of transmitting circuits for transmitting commands and other control signals;

f. A piurality of sequence circuits for performing repetitive complex sequences of processing actions in response to a single order word or trouble condition;

g. Clock sources which supply clock pulses for defining a machine cycle and a plurality of times within the machine cycle, and h. A plurality of gating circuits (Order Combining Gate 400) for combining timing pulses of the clock sources with DC conditions derived within the main processor and the auxiliary processor. The main processor of FIGS. 3, 4, and 5 is a synchronous system in the sense that the functions within the main processor are under the control of output signals of the Clock Circuit 401 of FIG. 4. The auxiliary processor (FIG. 6) operates synchronously with the main processor (FIGS. 3 through 5) when it is active since it is also under the control of the Clock 401 of the main processor. The Program Memory 200, the Temporary Memory 250, and the various input-output devices of FIG. 1 are each passive in the absence of a command from the main processor or the auxiliary processor and do not operate in time synchronism with the Clock 401 of the main processor. The details of substantial portions of the main processor (e.g., the Decoders 402, 403, 404, and the Order Combining Gates 400) are not shown in the drawing nor described herein as the mass of this detail would merely tend to obscure the inventive concepts of my system.

Figure 6:
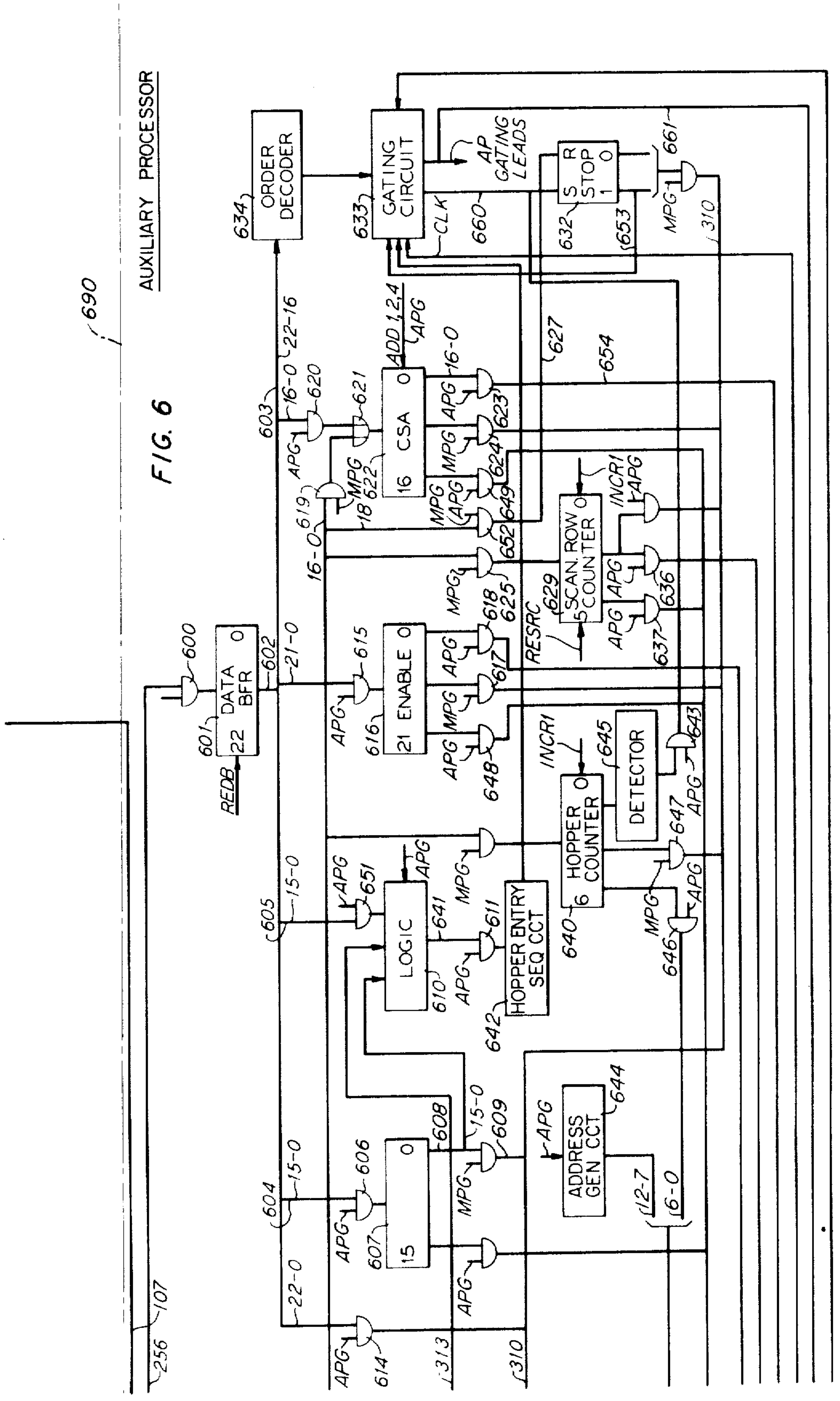
FIG. 6 illustrates the auxiliary processor.

This invention is concerned with the accomplishment of routine scanning of lines, trunks, and junctors of a communication switching system under the control of the auxiliary processor of FIG. 6. Accordingly, the description of the manner in which the main processor of FIGS. 3, 4, and 5 accomplishes these work functions in the arrangements set forth in the aforenoted copending application of Doblmaier et al. is not described herein as this is not necessary to an understanding of the present invention.

Main Processor Responses to Program Order Words

The main processor includes a Program Address Register 500 which is employed to address the Program Memory 200 to obtain both program order words and data. Program Memory addresses are transmitted from the Program Address Register 500 to the Program Memory 200 via the AND gate arrangement 501. The symbolic gate 501 represents a plurality of AND gates equal in number to the number of bits contained in the program memory address, which is obtained from the Program Address Register 500. Similarly, the Cable 502 represents a number of conductors or pairs of conductors equal in number to the bits in the transmitted data word. This symbology is employed throughout the drawing. Furthermore, only the logical functions are represented in the drawing and there is no showing of amplifiers which may be required in such arrangements.

The Program Memory 200 comprises a Control Circuit 202, a Time Circuit 203, an Access Circuit 207, a Memory Circuit 201, a Readout Circuit 204, and an Operational Checking Circuit 205. As previously noted, the program memory is passive in the absence of a command from the main processor over the Conductor Group 502. Upon receipt of a command, the program memory control, in accordance with signals derived from the Timing Circuit 203, decodes the received command and obtains access to the Memory 201 through the Access Circuit 207. The Memory 201 is thus read at a memory address specified in the command and, at a specified time in the memory cycle defined by the Timing Circuit 203, a 44-bit word is transmitted from the Memory 201 via the Readout Circuit 204 and Cable 206 to the main processor. As seen in FIG. 3, 28 bits of this program memory word are received in the Buffer Order Word Register 304 and 16 bits are received in the Auxiliary Buffer Order Word Register 303. The Auxiliary Buffer Order Word Register serves to hold these 16 bits for a short interval of time which is sufficient to ensure that the work functions with respect to the preceding order word have been completed. The program memory response word comprises three portions, namely, a 21-bit data portion, a 16-bit instruction portion, and a seven-bit Hamming check portion. Successive program order words are obtained by incrementing the address in the Program Address Register 500 by means of the Add One Circuit 503 of FIG. 5. The contents of the Program Address Register 500 are incremented by a count of one by the Add One Circuit 503, and the incremented address word is transmitted back to the program address register via AND-gate 504. Transfer addresses are obtained in a plurality of ways by the main processor and, in each instqnce, are transmitted to the Program Address Register 500 via the Index Adder Complex 405 of FIG. 4.

In the particular main processor of the illustrative embodiment, order words are executed on an overlap basis. That is, the processor performs, in parallel, noninterfering gating actions in response to two successive order words. The first gating actions, with respect to a program order word, are executed while the order word resides in the Buffer Order Word Register 304 and, at a precise time within the machine cycle defined by the Clock Circuit 401, the order word is transferred from the Buffer Order Word Register 304 to the Order Word REgister 406, and other gating actions are performed while the order word resides in the Order Word Register 406. The Buffer Order Word Decoder 407 interprets the 16-bit instruction portion of an order word which resides in the buffer order word register and the Order Word Decoder 402 interprets a 16-bit order word when it resides in the Order Word Register 406. The Mixed Decoder 403 resolves conflicts which may arise in the execution of the two successive order words which are at any given instant in the Buffer Order Word Register 304 and the Order Word Register 406.

The Order Combining Gates 400 combine the DC output signals of the Decoders 407, 402, 403, and output signals of the Clock 401 and provide output gating signals on the Order Cable 408. As will be seen later herein, there is a decoder circuit in the auxiliary processor which also generates gating signals. To avoid confusion, the gating signals which are obtained from the Order Combining Gate Circuit 400 are identified with the prefix "M" and the gating signals which are obtained from the auxiliary processor are identified with the prefix "A."

Transfer of information within the main processor between the principal sources of data and the principal data loads is by way of the First Transfer Bus 409, the Second Transfer Bus 410, and the Logical Processing Circuit 350. Each of these buses comprises a plurality of conductors equal in number to the number of bits in a data word. In this one illustrative embodiment, a 23-bit data word is employed. The Logical Processing Circuit 350 is arranged to operate upon two-word organized operands. The one operand always comprises the contents of the LR-Register 323. The other operand, however, may be selected by the order word being executed from any of the major data sources within the main processor. In the illustrative embodiment, the second operand may be obtained from:

a. Any one of a plurality of flip-flop registers, e.g., X-Register 411, Y-Register 412, Z-Register 413, K-Register 505, F-Register 506, and the J-Register 507;

b. The Data Buffer Register 315 which is employed in communicating data from and to the memory system; and c. The output register of the Index Adder Arrangement 405.

In the illustrative embodiment, a program order word specified one or both of the operands and defines the mode of operation of the Logical Processing Circuit 350. The logical processing circuit provides for the combining of the two operands by product-masking (AND), union-masking (OR), EXCLUSIVE-OR masking. The data word which results from product or union masking may be complemented. That is, the data word which results from the combining of the two operands by product or union masking will comprise a series "1's and "0's." Complementing this word results in a new word wherein each "1" of the original word is replaced by a "0" in the new word, and vice versa.

Additionally, there is the possibility of moving a data word from a data source to a data destination via the Logical Processing Circuit 350 without alteration, or the word being moved may be merely complemented while passing through the Logical Processing Circuit 350. Advantageously, in accordance with this illustrative embodiment wherein all of the major data sources within the main processor have direct access to the logical processing circuit, it is not necessary to transfer data first to the accumulator complex, perform the desired processing, and subsequently transfer the data to a destination register or to memory. Rather, data occurring in any one of the principal data sources within the processor may be processed directly while moving the data from the source to a prescribed destination register.

The accumulator complex shown in FIG. 4 comprises a second major data processing facility within the main processor. The accumulator complex comprises the KA-Input Register 414, the KB-Input Register 415, the K-Input Logic 416, the K-Register 505, the Shift and Rotate Circuit 508, and one Circuit 417. The K-Input Logic 416 is arranged to combine the contents of the KA-and KB-Input Registers 414 and 415 by the logical functions OR, AND, ADD, EXCLUSIVE-OR.

The Shift and Rotate Circuit is arranged to accept the contents of the K-Register 505 and to provide to the K-Register a data word which results from shifting or rotating the contents of the K-Register either left or right any number of bits from one through 22. The K-Logic Homogeneity Circuit 417 monitors the output signals of the K-Input Logic 416 and provides output signals which indicate that the monitored signals are homogeneous or inhomogeneous. The output signals of the K-Logic Homogeneity Circuit 417 serve to set and reset the Homogeneity Flip-Flop 418.

The Detect First One Circuit 509 is arranged to monitor the contents of the K-Register 505 and to provide a five-bit output word which defines the rightmost bit position in which a "1" occurs in the rightmost 16-bit positions of the K-Register 505.

The Control Homogeneity Circuit 419 serves a similar function to that of the K-Logic Homogeneity Circuit 417. This latter circuit monitors data on the Second Transfer Bus 410, likewise, controls the Homogeneity Flip-Flop 418 in accordance with the data which is monitored.

The data buffer register complex comprises the Data Buffer Register 315, a plurality of Auxiliary Data Buffer Registers, e.g., 317, 320, and the Data Buffer Buses 309 and 310. The Data Buffer Register 315, as previously explained, receives output signals of the Temporary Memory 250 via the Cable 256 and AND-Gate 306. Data to be written in the Temporary Memory 250 is transmitted from the output terminals of the Data Buffer REgister 315 to the Data Register 257 of the temporary memory via AND-Gate 308 and the Cable 307.

The auxiliary processor of FIG. 6 may be termed an "autonomous scanning control circuit." The lines, trunk circuits and junctor circuits of this system are organized in ordered groups for purposes of scanning. The term trunk circuits and junctor circuits of this system are organized in ordered groups for purposes of scanning. The term trunk circuit as employed herein refers to trunk circuits connected to distant offices and to operators, while the junctor circuits are in effect intraoffice trunk circuits. Each line circuit requires one scanning element since only a subscriber station set is scanned for supervision. However, each trunk circuit and each junctor circuit requires two scanning elements since such circuits are connected to two sources of supervisory information. A scanner comprises a plurality of rows of 16 scanning elements each. Accordingly, a single scanner row serves 16 lines, eight trunk circuits or eight junctor circuits. The current supervisory states of the elements of a group are obtained by addressing the appropriate line, trunk, or junctor scanner over the peripheral Cable 104. The information transmitted over the Cable 104 comprises a scanner row address and the appropriate scanner (e.g., 123, 135) is enabled by an output signal of the Central Pulse Distributor 143. The Central Pulse Distributor 143 is an electronic translating circuit which responds to binary-coded signals on Cable 107 and selectively generates output signals in a 1-out-of-*n* code on the conductors of Cable 111. The output signals of the Scanners 123, 127, 135 are transmitted in parallel on Cable 108 which terminates in AND-Gates 326 and 311. AND-Gate 326 is employed to gate the scanner response to the LR Register 323 when the main processor is performing scanning while the AND-Gate 311 is employed to gate the scan response to the Scan Response Register 312 when the auxiliary processor is performing scanning.

The auxiliary processor of FIG. 6 is autonomous only within limits. The main processor of FIGS. 3 through 5 initializes the Scanner Row Counter 629, the Hopper Counter 640, the CSA-Register 622 and controls the resetting of the Stop Flip-Flop 632. Additionally, the main processor may examine the contents of the Hopper Counter 640, the Enable REgister 616, and the CSA-Register 622 and Register 607. After the above-noted elements of the auxiliary processor have been initialized and the Stop Flip-flop 632 reset, the processor will proceed in the routine scanning of lines, trunks, and junctors under control of program sequences obtained form the Temporary Memory 250. These program sequences, which are described in detail later herein, serve to control a scanner to obtain the current states of the lines, trunks, or junctors of a group, to control the Temporary Memory 250 to obtain the last-known states of the elements of the same group, and to logically process this data to identify requests for service and for disconnect.

Figures 7, 8:
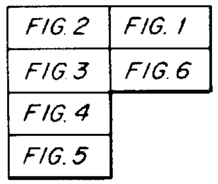
FIG. 7 shows the combining of data.
FIG. 8 is a key sheet showing the arrangement of FIGS. 1 through 6.

The logical combining of the scanner response word and the last look word obtained form the Register 607 is shown in FIG. 7. The scanner answer word comprises a pattern of "0's" and "1's wherein a "0" represents the off-hook state and a "1" represents the on-hook state. Opposite symbology is employed in the case of the last look word. A "0" in a bit position of the last look word indicates that a line, trunk, or junctor was in the on-hook state while a "1" indicates that the line, trunk, or junctor was priorly in the off-hook state. The scanner response work obtained from the Scan Response Register 312 and the last look word obtained from the Data Buffer REgister 601 are combined through the logical function OR. The complement of the resulting word comprises a service request word wherein there is a "1" in each bit position associated with a line-requesting service. A request for service is a significant condition which requires further attention by the main processor.

For each group of 8 trunk circuits or junctor circuits, there are two corresponding words, T1 and T2, in the Temporary Memory 250. The T1 words correspond to the last look words which are employed in the case of line scanning. The T2 words are employed to indicate that a trunk circuit is presently being served by the main processor and that the results of routine scanning may be ignored. For example, after a request for service has been detected, the main processor sets the T2 bits of the requesting trunk to the "0" state to indicate that supervisory changes may be temporarily ignored by the auxiliary processor. The T2 word comprises a pattern of "1's" and "O' s" and this word is combined with the service request word by the logical function AND. The resultant data word comprises a "1" in each bit position representative of a trunk circuit exhibiting an on-hook transition and not currently served by the main processor. In the case of line scanning, the scanning element is physically disconnected from the line after a request for service has been served by the main processor. Accordingly, there can be no current flowing in that line-scanning element and at each successive scan the line will appear to be in the on-hook state. During line scanning, off-hook to on-hook transitions are ignored as line scanning is only employed to detect requests for service. The scanning of lines to detect requests for disconnect or additional service is transferred to the junctor circuits in the case of intra-office calls or to trunk circuits in the case of calls to a distant office or to an operator.

There is provision in this system for "line load control." Line load control is implemented by means of a line load control masking word which is obtained from the Memory 250. In the usual case (i.e., when the office is not in an overload condition) all bits of the line load control word are in the "1" state. A service request word wherein there is a "1" in each bit position having a request for service is combined with the line load control mask word by the function logic AND. In the above-noted normal condition the resultant line load service request word is identical to the prior described service request word. In periods of system overload service may be temporarily denied to subscribers in accordance with a priority plan and a timing plan. Accordingly, when an office is in the overload condition a line load control word having a pattern of "1's" and "O's" is employed. If there is a "1" in a bit position of the line load control word, a request for service from a line of the row having the same corresponding bit position will be honored. However, in the event that the line load control contains a "0" in a bit position, then service from lines having the same corresponding bit position are denied. In accordance with this invention, the Logic Circuit 610 combines the contents of the Scan Response Register 312, the T1 Register 607, and the line load masking word obtained from the Temporary Memory 250 via the Data Buffer Register 601 and generates an output signal on Conductor 641 whenever there is a request for service from at least one line or trunk from a group of lines or trunks. The Logic Circuit 610 generates such an output signal on Conductor 641 and at an appropriate time this signal is gated through AND-Gate 611 to the Hopper Entry Sequence Circuit 642.

The Hopper Entry Sequence Circuit 642 generates control signals which are combined with clock signals in the Gating Circuit 633. These output signals of the Circuit 633 serve to place information relevant to the indicated request for service in a hopper (a group of word locations in the Temporary Memory 250). The information placed in the hopper comprises the contents of the following:

1. The Scan Row Counter 629
2. The Enable Register 616
3. The CSA Register 622

Additionally, the Hopper Entry Sequence Circuit 642 generates signals for incrementing the Hopper Counter 640 by a count of one as each word is entered in the hopper. The Hopper Counter 640 comprises seven stages for defining the seven least significant bits of an address in the Temporary Memory 250. The remaining bits 7 through 12 always comprise a "1" in bit position 12 and "O's" in bit positions 7 through 11. These constant address elements are generated by the Address Generator Circuit 644 when enabled by an autonomous processor gating lead which occurs coincident with the signal to enable the AND-Gate 646. By this arrangement the auxiliary processor of FIG. 6 may write only into a limited number of memory locations, the first 128 memory locations, in the Temporary Memory 250. Advantageously, therefore, the autonomous processor of FIG. 6 cannot inadvertently mutilate the contents of other locations in the Temporary Memory. The Detector Circuit 645 monitors the contents of the Hopper Counter 640 to determine when the last hopper has been employed by the auxiliary processor. If the Hopper Counter 640 has reached the all "1's" state AND-Gate 643 is enabled immediately after the hopper entry sequence circuit has completed its operation. This serves to set the Stop Flip-Flop 632 to its "1" state. At the same time the INCR1 conductor of the Hopper Counter 640 is energized to initialize the counter to the all "0" state.

The "1" Output Conductor 653 of the Stop Flip-Flop 532 is an input of the Gating Circuit 633. This connection serves to halt routine scanning by the auxiliary processor circuit until after the main processor has unloaded the hoppers and reset the Stop Flip-Flop 632.

The above discussion has been directed to the functions performed by the auxiliary processor without regard for the interaction of the main processor and interference between the main processor and the auxiliary processor in the control of the peripheral units and the control of the shared Temporary Memory 250. The Main Processor 100 is afforded absolute priority in the accessing of the peripheral units and the Temporary Memory 250. The Order-Combining Gates 400 of the main processor generate an output signal on Conductor 430 when the Main Processor 100 requires access to either a peripheral unit or access to the Temporary Memory 250. The signals on Conductor 430 appear as input signals to the Gating Circuit 633 of the auxiliary processor. These signals serve to temporarily inhibit operation of the auxiliary processor. Accordingly, the temporary processor of FIG. 6 operates in time synchronism with the main processor. However, during any machine cycle in which the Main Processor 100 requires access to the peripheral circuits via the Bus 104 or to the Temporary Memory 250, the auxiliary processor will remain inactive. Output signals of the Gating Circuit 633, which appear on Conductor 661, comprise an input to the Order-Combining Gates 400 of the Main Processor 100. These signals indicate to the main processor the machine cycles in which the auxiliary process is accessing the periphery or the Temporary Memory 250. Accordingly the operation of the main processor may be modified if the auxiliary processor has initiated a function which involves the accessing of the periphery or of the Temporary Memory 250.

The auxiliary processor employs a set of eight order words enumerated below. Each order word comprises an instruction portion and a data portion.

| Order Word | Coding of Bits 22–16 | Functional Description |
|---|---|---|
| A | 1XXXXXX | Reset Scanner Row Counter **629**, increment contents of CSA Register **622** by count of one, load contents of Data Buffer Register **601** bits 21–0 (data portion of this instruction) in the Enable Register **616**. The contents of the Enable Register **616** and the Scanner Row Counter **629** are gated to the CPD Translator **551** and to the Command Translator **550**, respectively, via AND-Gates **618** and **636**. |
| B | 010001X | Load the data portion of this order word (bit positions **0–16**) in the CSA Register **622**. |
| C | 0100000 | This order word is employed to obtain T2 words in the case of trunk-scanning and line control words in the case of line scanning. Load the data portion (bits **0–15**) of this instruction in the Register **607**, increment the contents of the CSA Register **622** by a count of one. |
| D | 0100001 | This instruction is employed to obtain T1 words from the Temporary Memory **250**. The T1 bits are contained in bit positions **0–15** of these order words. The T1 bits are gated from the Data Buffer Register **601** to the Logic Circuit **610** via the AND-Gate **651**. This instruction is employed to detect both requests for service and requests for disconnect. Therefore, the control signals to the Logic Circuit **610** so indicate. The contents of the Enable Register **616** and the Scanner Row Counter **629** are gated to the CPD Translator **551** and to the Command Translator **550**, respectively. Additionally, this instruction increments the contents of the CSA Register **622** and the contents of the Scanner Row Counter **629** each by a count of one. |
| E | 0101001 | This instruction is employed to scan lines. The contents of the Enable Register **616** and the Scanner Row Counter **629** are gated to the CPD Translator **551** and to the Command Translator **550**, respectively, via AND-Gates **618** and **636**. This instruction also increments the Scanner Row Counter **629** and the contents of the CSA Register **622** by a count of one. |
| F | 0101101 | This instruction is employed to scan junctor scan points for disconnect. As in the case of instruction E, the contents of the Enable Register **616** and the Scanner Row Counter **629** are gated to the CPD Translator **551** and to the Command Translator **550**, respectively. The contents of the Enable Register **616** and the Scanner Row Counter **629** are gated to the CPD Translator **551** and to the Command Translator **550**, respectively. The Logic Circuit **610** examines the contents of the Scan Response Register **312** and the data portion of the instruction (bit positions **0** through **15**) to detect significant supervisory changes. Furthermore, this instruction serves to increment the Scanner Row Counter **629** by a count of one, to increment the contents of the CSA Register **622** by a count of one and to generate an order cable signal that modifies the operation of the Logic Circuit **610** to examine the input data for off-hook to on-hook transitions (i.e., an indication of a request for disconnect). |
| G | 0100100 | This instruction serves to set the Stop Flip-Flop **632** to the "1" state and to increment the contents of the Scanner Row Counter **629** by a count of one or two as indicated by the coding of bit positions **15** and **17** of the order word. |

A typical set of work functions (both main processor and auxiliary processor) for scanning to detect requests for service is set forth below:

The main processor initiates scanning by loading the contents of the Buffer Register 315 in the CSA-Register 622 via AND-Gate 619. This establishes in the CSA-Register 622 the address in the Temporary Memory 250 of the first order word of the auxiliary processor program sequence. The main processor also transmits the content of bit position 18 of the Buffer Register 315 to the reset terminal of the Stop Flip-Flop 632 via AND-Gate 652 and Conductor 627 to reset the Stop Flip-Flop 632. This removes the inhibit on Conductor 653 and initiates program control of the auxiliary processor. The contents of the CSA-Register 622 are gated to the Control 252 of the Temporary Memory 250 via AND-Gate 623 and Conductor 654. The Temporary Memory 250 responds to the information obtained from the CSA-Register 622 and transmits an output word on Group 256. When the auxiliary processor has generated the address signals for reading the Temporary Memory 250, the response obtained thereby is gated to the Data Buffer Register 601.

An illustrative sequence of instructions for scanning lines, trunks and junctors is set forth below:

A, C, B, E, E, ... E, B, A, B, C, D, C, D, ...
B, A, B, F, F, ... B, Stop.

In this illustrative sequence first lines are scanned (by means of the series of instructions E), then trunks are scanned (by the sequence of couplets of instructions C and D), and then the junctors are scanned (by the sequence of instructions F).

The first instruction of the illustrative sequence is obtained as set forth above. In the example, the first order word of the sequence is the order word A. This order word comprises a data field which defines the enable address of the particular scanner (e.g., line scanner, junctor scanner, or trunk scanner). In the illustrative sequence the address of a Line Scanner 123 is specified. The enable address is gated from the Data Buffer Register 601 to the Enable Register 616 via AND-Gate 615. At the same time the decoding of bit position 22 of this order word serves to generate order cable signals which automatically reset the Scanner Row Counter 629 to the initial state.

The next instruction, order word C, is obtained from the Temporary Memory 250. The immediately preceding instruction A served to increment the contents of the CSA-Register 622 by a count of 1. The new contents of the CSA-Register comprise the memory address of this instruction C. The data portion of this instruction (bits 0 through 15) comprise a line control word which is transferred from the Register 601 to the Register 607 via the AND-Gate 606. As previously explained, the line control word comprises a pattern of "0's" and "1's." Wherever a "0" is present in the word, the lines associated therewith are temporarily denied service. For the purposes of the present discussion it is assumed that a system overload condition does not exist and the entire data word comprises "1's." The instruction C also serves to increment the contents of the CSA-Register 622 by a count of 1 which is the address of the next instruction of the sequence which is the order word B. This is a transfer instruction which serves to establish in the CSA-Register the memory address of the first instruction of a sequence of identical instructions which effect line scanning. The order word B serves to load the data portion of the order word (bit positions 0 through 17) in the CSA-Register 622 to establish the memory address of the first instruction E which, as previously explained with respect to the machine order structure is employed to scan lines.

The instruction E gates the contents of the Enable Register 616 to the CPD-Translator 551 via AND-Gate 618 and the contents of the Scanner Row Counter 629 to the Command Translator 550 via the AND-Gate 636. This instruction also increments the contents of the Scanner Row Counter 629 by a count of 1 and the contents of the CSA-Register 622 by a count of 1. Output signals of the CPD-Translator 551 are transmitted to the Central Pulse Distributor 143 via Conductor Group 107. The resulting output signal of the central pulse distributor enables the appropriate line scanner to respond to the output signals of the Command Translator 550 on the Cable 104. The enabled scanner transmits its response to the Scan Response Register 312 via the Cable 108 and the AND-Gate 311. The output conductors of the Scan Response Register 312 are connected directly to the Logic Circuit 610 via the Conductor Group 313.

The data portion of the instruction E (bit positions 0 through 15) comprises the last look word for the addressed scanner row. The information in position 0 through 15 of the Data Buffer Register 601 is gated to the Logic Circuit 610 via AND-Gate 651.

At this point in time the inputs to the Logic Circuit 610 comprise the contents of the Scanner Response Register 312 (current states of the line scanned), the contents of the REgister 607 (the line load control word), and the contents of bit positions 0 through 15 of the Data Buffer Register 601 (states of the lines scanned upon the occurrence of the immediately preceding scan). The instruction E further generates auxiliary processor control signals which define the rule of action of the Logic Circuit 610. The combining of the three enumerated elements of data to generate a service request word is illustrated in FIG. 7. A "1" in the scanner answer word in the Register 312 represents a line in the on-hook state while a "0" represents a line in the off-hook state. A "1" in the last look word in bit positions 0 through 15 of the data buffer register represents a line in the off-hook state while a "0" represents a line in the on-hook state. Accordingly, the logical OR of the scanner answer word in the Register 312 and the last look word in the Register 601 is a data word wherein there is a "0" associated with each line which has experienced a change from the on-hook state to the off-hook state.

As seen in FIG. 7 the Circuit 610 performs a COMPLEMENT function on this data word and generates a service request word wherein there is a "1" in each bit position representative of a line which has experienced a change from on-hook to off-hook. This service request word is combined with the line control word by the logical function AND. In the example in FIG. 7 service is denied to all lines except the lines represented by bit position 15 in the service request word. Accordingly, in FIG. 7 the line control service request word (the data word in the last line of the figure) contains a "1" only in bit position 15 and the request for service from the lines associated with bit positions 0 and 4 are not recognized. As previously explained with respect to the illustrative sequence, it is assumed that the line control word comprises all "1's." Accordingly, in that case the service request word and the line control service request word are identical.

Whenever the line control service request word comprises at least one "1" the output Conductor 641 of the Logic Circuit 610 will be enabled. That is, when at least one request for service is present in the group of lines scanned, the Logic Circuit 610 will generate a signal on Conductor 641. The Gate 611 is enabled by an output signal of the Order Detector 634 when an instruction E resides in the Data Buffer Register 601. Accordingly, when the Conductor 641 is energized the Gate 611 will be enabled to initiate activity of the Hopper Entry Sequence Circuit 642. The Hopper Entry Sequence Circuit 642 momentarily seizes control of the auxiliary processor and generates signals to record data relative to the detected request for service in the reserved hopper area of the Temporary Memory 250. The hopper area is shared by the main processor and the auxiliary processor and provides a means for communication between the auxiliary processor and the main processor.

There are a number of two-word hoppers in the temporary memory, therefore the auxiliary processor of FIG. 6 maintains a record of the next available hopper by means of the Hopper Counter 640. The hopper area in the Temporary Memory 250 comprises 128 word locations. Therefore, the 7 bits (0 through 6) of the hopper counter comprise the 7 low-ordered bits of the memory address. The high-ordered bits of the memory address are provided by the Address Generator 644. The Hopper Entry Sequence Circuit 642 provides signals for enabling the Address Generator 644 and the AND-Gate 646 to transmit the memory address to the Temporary Memory 250. The information which is placed in the hopper comprises the enable address obtained from the Register 616 and the contents of the Scan Row Counter 629. The hopper entry sequence circuit, at appropriate times, enables the AND-Gate 648 to transmit the contents of the Register 616 to the Data Register 257 of the temporary memory. The Hopper Entry Sequence Circuit 642 generates signals to increment the Hopper Counter 640 by a count of 1 to achieve the memory address at which the contents of the Scanner Row Counter 629 are entered. After both entries have been made, the Hopper Entry Sequence Circuit 642 again increments the contents of the Hopper Counter 640 by a count of 1 in preparation for the next enablement of the Hopper Entry Sequence Circuit 642.

It should be noted that in the course of scanning lines the auxiliary processor of FIG. 6 does not update the last look word. This is possible since once a request for service has been detected from a group of lines, notation of this is made in the hopper and subsequently the main processor of FIGS. 3 through 5 empties the hopper, identifies the line or lines requesting service, updates the last look entry, and provides the necessary service.

In FIG. 6 there is shown an overflow Detector 645 which monitors the contents of the Hopper Counter 640. When the hopper counter reaches the maximum count (all "1's") the output conductor of the Detector 645 is enabled and subsequently AND-GATE 643 is enabled. The output signal of the Gate 643 sets the Stop Flip-Flop 632 to the "1" state which by a signal on Conductor 653 inhibits further action of the auxiliary processor of FIG. 6 until the Stop Flip-Flop 632 has been reset under control of the main processor. When the Hopper Entry Sequence Circuit 642 has completed registration of the necessary data in the appropriate hopper it returns control of scanning to the auxiliary processor by gating the contents of the CSA-Register 622 to the Control 252 of the Temporary Memory 250 via AND-Gate 623 and Conductor Group 654.

Line scanning continues until the last instruction E of the illustrative sequence is reached. The immediately succeeding B-instruction is a transfer instruction to the memory address at which the following instruction A is located. The A-instruction is employed to initialize the Enable Register 616 to initiate trunk scanning and to reset the Scanner Row Counter 629. The immediately succeeding B-instruction is a transfer to the address in memory at which the first couplet of instructions C and D is located. The C-instructions are employed to obtain T2 words from the Temporary Memory 250. The D-instructions obtain T1 words from the temporary memory and effect scanning of the trunks.

As previously indicated, the T1 words and the T2 words which each comprise 16 bits are associated with a group of eight trunks. In the case of the T1 words, the two bits associated with a trunk circuit define the last known supervisory states of the circuits connected to the trunk circuit. That is, a trunk circuit is connected to a line or another trunk or service circuit through the switching network and is connected to a distant office via a transmission trunk. The T2 word, although it comprises two bits for each trunk of the group, always merely indicates that the associated trunk circuit is or is not under supervision from another circuit Accordingly, the two bits of a T2 word associated with a particular trunk circuit are always either both "0's" or both "1's."

The data portion (bits 0 through 15) of the C-instruction comprises the gated word which is transferred from the Data Buffer Register 601 to the Register 607 via the AND-gate 606. Thus, the T2 words are presented as inputs to the Logic Circuit 610 in the same manner as the line control words were presented in the case of line Scanning. The D-instruction gates the scanner enable information and the contents of the Scanner Row Counter to the CPD-Translator 551 and to the Command Translator 550 to effect scanning of the group of eight trunks. The data portion of the D-instruction (bits 0 through 15O comprises the T1 word and this is gated from the Data Buffer Register 601 to the Logic Circuit 610 via the AND-gate 651. As in the case of line scanning, the scan response is gated to the Scan Response Register 312 via the AND-Gate 311 and thus appears as an input to the Logic Circuit 610 via the conductor Group 313.

The operation of the Logic Circuit 610 is determined by a decoding of the instruction portion of the D-order word. As previously explained, in the case of trunks, scanning is performed to detect both on-hook to off-hook transitions and off-hook to on-hook transitions. Accordingly, the Logic Circuit 610 generates an output signal on the Conductor 641 whenever a transition of either type is detected with respect to a group of trunks. As in the case of line scanning, the Hopper Entry Sequence Circuit 642 is enabled in response to a signal of the Logic Circuit 610 and it serves to place the relevant information in the next available hopper in the Temporary Memory 250. The Hopper Entry Sequence Circuit 642, upon completion of its work cycle, returns control of the circuitry of FIG. 6 to the illustrative program. As seen in the illustrative sequence, the series of couplets of C- and D-instructions are followed by a transfer instruction B which effects transfer to an instruction A. This A-instruction, like the A-instructions which precede the instructions which effect line scanning and trunk scanning, is employed to place a new enable address in the Register 616 and to reset the Scanner Row Counter 629. This prepares for the scanning of the junctor circuits. Immediately following this A-instruction there is another B-transfer instruction which obtains the first F-instruction of the junctor scanning sequence. Junctor scanning is performed to detect only off-hook to on-hook transitions (hangup). In the case of junctor scanning there is no data corresponding to the line control word or to the T2 word. Therefore, only the scan response and the last look word for the group of junctors are combined in the Logic Circuit 610. In the event that a significant supervisory change, i.e., off-hook to on-hook, is detected the Hopper Entry Sequence Circuit 642 will be enabled and the relevant information defining the group of junctors will be stored in the hopper.

Upon completion of the last F-instruction of the junctor scanning sequence there is a B-transfer instruction which obtains a "stop" instruction which has not been previously described Decoding of the stop instruction enables the output Conductor 660 of the Gating Circuit 633 to set the Stop Flip-Flop 632 to its "1" state. Thus, further activity of the auxiliary processor of FIG. 6 is inhibited until such time as the main processor restores the Stop Flip-Flop to its "0" state.

In this illustrative example lines, trunks and junctors are scanned to detect specified significant conditions and a record which defines a group of lines, trunks or junctors which has experienced at least one significant change is made in a hopper in a shared memory. Subsequently, the main processor of FIGS. 3 through 5 empties the hoppers, again scans the identified group of lines, trunks or junctors to identify the particular lines, trunks or junctors which have experienced a significant supervisory change and subsequently provides the necessary service. It is obvious to one skilled in the art that additional functions, such as last look word recording, may be performed by the auxiliary processor of FIG. 6 without departing from the teachings of this invention.

What is claimed is:

1. A telephone switching system comprising:
a plurality of lines and trunks,
a switching network for interconnecting said lines and trunks,
a scanner arrangement for scanning said lines and trunks,
a first control means,
a second control means, and
memory means shared by said first and said second control means;
said first control means comprises means for generating control signals for obtaining information from and transferring information to said shared memory means, means for generating network control signals for controlling said switching network, and means for generating discrete output signals when said first control means is obtaining information from or transferring information to said shared memory means; and
said second control means comprises means for reading information from said shared memory means, means for obtaining information from said scanner arrangement, means for combining said information from said shared memory means and said scanner arrangement, and means responsive to said discrete output signals for inhibiting said second control means from accessing said shared memory means.

2. A telephone switching system comprising:
a plurality of lines and trunks;
a switching network for interconnecting said lines and trunks;
a scanner arrangement for scanning said lines and trunks:
a first control means;
a second control means; and
memory means shared by said first and said second control means;
said first control means comprises means for reading information from and transferring information to said shared memory means, means for controlling said switching network and means for generating signals for inhibiting said second control means when said first control means is engaged in reading information from or transferring information to said shared memory and when said first control means is actively controlling said switching network; and said second control means comprises means for reading information from and writing information into said shared memory means, means for obtaining information from said scanner arrangement, and means for combining said information from said shared memory and from said scanner arrangement, and said second control means in response to said inhibit signals momentarily halts operation.

3. In a telephone switching system a plurality of lines, a plurality of trunks, a switching network for selectively interconnecting said lines and said trunks;

a first program controlled processor comprising; a first memory-containing sequences of program order words and data and a first control means comprising means for reading information from said memory means, means for executing said sequences of program order words and means for generating command signals for controlling said switching network;

a plurality of scanners for generating output signals defining the supervisory states of associated ones of said lines and said trunks in response to scanner command signals;

a second control means;

a second memory means shared by said first and said second control means; said second memory means containing second sequences of program order words for controlling said second control means and data; said second sequences of program order words and certain of said data being stored in said second memory means in memory locations which are defined by a first set of memory addresses, other of said data being stored in said second memory means in memory locations which are defined by a second set of memory addresses;

said second control means comprises means for reading information from said second memory means and means for writing information into said second memory means only at memory locations defined by said second set of memory addresses, means for executing said second sequences of program order words and means for generating commands for controlling said scanners.

4. In a telephone switching system the combination comprising:

a plurality of lines, a plurality of trunks, scanning means for generating output signals defining the supervisory states of said lines and said trunks in response to scanner command signals; a first program controlled processor comprising a first control means and a first memory means containing sequences of program order words for controlling said first control means and data to be processed by said first control means;

a second control means; a second memory means containing sequences of program order words for controlling said second control means and data to be processed by both said first and said second control means; said second control means comprising means for addressing said second memory means at a limited number of address locations defined by a first set of memory addresses, said programs for controlling said second control means and certain of said data being contained in said second memory means at memory locations defined by said first set of memory addresses; and said first control means comprises means for generating memory addresses for accessing said second memory means at all memory locations thereof, means for modifying said second sequences of program order words and means for controlling said switching network in accordance with data obtained by both said first and said second control means.

5. A program-controlled telephone switching system wherein a first program-controlled processor comprising a first control means and a first memory-containing sequences of program order words and data performs the control functions of the telephone switching system, the improvement comprising:

a second control means;

a second memory means containing second sequences of program order words and data; and wherein said second control means operating in accordance with said second sequences of program orders words and data controls portions of said switching system to detect requests for attention from said lines and said trunks and wherein said second control means comprises means for entering in said second memory means data defining a line or trunk requesting attention and wherein said first control means comprises means for directly accessing said second memory means and means responsive to said data entered by said second control means for controlling said switching system.

6. A telephone switching system in accordance with claim 5 wherein said first control means comprises means for altering said second sequences of program order words and said data stored in said second memory means.

7. In a program-controlled telephone switching system comprising a plurality of lines, a plurality of trunks, a switching network for selectively interconnecting said lines and said trunks, a network control arrangement responsive to command signals for controlling said switching network and a scanner arrangement responsive to scanner command signals for generating output signals defining the supervisory states of lines and trunks defined by said scanner command signals, a program controlled processor comprising a first control means and a first memory means containing sequences of program order words for controlling said first control means and data employed by said first control means; the improvement comprising: a second program-controlled processor for performing system input functions and comprising a second control means, a second memory means containing second sequences of program order words for controlling said second control means and data, and said second control means comprises means for generating memory addresses for writing information into a limited number of memory locations of said second memory means; and wherein said first control means comprises means for generating memory address signals for directly accessing said second memory means at all memory locations thereof.

8. A telephone switching system in accordance with claim 7 wherein said second control means operating in accordance with said second program sequences generates scanner command signals and second memory-reading signals to detect significant changes in supervisory states of lines and trunks and for generating a discrete signal upon detection of a significant change; and said second control means further comprises means for momentarily halting execution of said second program sequences and for writing in a selected one of a plurality of hopper registers each comprising a plurality of words in said second memory means source data defining the line or trunk from which a significant change was detected; and said first control means comprises means for directly examining said hopper registers, and means responsive to said source data for controlling said telephone switching system.

9. In a program-controlled telephone switching system comprising a plurality of lines, a plurality of trunks, a switching network for selectively interconnecting said lines and said trunks, a network control arrangement responsive to command signals for controlling said switching network and a scanner arrangement responsive to scanner command signals for generating output signals defining the supervisory states of lines and trunks defined by said scanner command signals, a program-controlled processor comprising a first control means and a first memory means containing sequences of program order words for controlling said first control means and data employed by said first control means; the improvement comprising: a second program controlled processor for performing system input functions and comprising a second control means, a second memory means containing second sequences of program order words for controlling said second control means and data; and wherein said second control means operating in accordance with said second program sequences generates scanner command signals and second memory-reading signals to detect significant changes in supervisory states of lines and trunks and for generating a discrete signal upon detection of a significant change, and said second control means further comprises means for momentarily halting execution of said second program sequences and for writing in a selected one of a plurality of hopper registers each comprising a plurality of words in said second memory means source data defining the line or trunk from which a significant change was detected; and said first control means comprises means for directly examining said hopper registers and means responsive to said source data for controlling said telephone switching system.

* * * * *

UNITED STATES PATENT OFFICE
CERTIFICATE OF CORRECTION

Patent No. 3,629,851 Dated December 21, 1971

Inventor(s) Werner Ulrich

It is certified that error appears in the above-identified patent and that said Letters Patent are hereby corrected as shown below:

Column 1, line 55, "A. H. Doblmaier" should read --R. W. Downing--. Column 2, line 55, "Doblmaier" should read --Downing--. Column 4, line 59, "Dablmaier" should read --Downing--. Column 6, line 27, "Doblmaier" should read --Downing--. Column 7, line 58, "specified" should read --specifies--. Column 8, line 13, after "and", second occurrence, "one" should be deleted and --the K Logic Homogeneity-- should be inserted. Column 8, lines 49, 50, 51, delete the sentence "The term trunk circuits and junctor circuits of this system are organized in ordered groups for purposes of scanning". Column 9, line 23, "form" should read --from--; line 31, "work" should read --word--; line 37, "line-requesting" should read --line requesting--. Column 10, line 2, "prior" should read --priorly--; line 60, "Flip-Flop 532" should read --Flip-Flop 632--. Column 15, line 23, delete "gated" and substitute --T2--; line 32, "150" should read --15)--. Column 16, line 1, "described" should be followed by a period. Column 17, line 2, "memory-containing" should read --memory means containing--; line 32, before "a plurality", first occurrence, --a switching network,-- should be inserted; after line 58 and before line 59 --comprising a plurality of lines and trunks,-- should be inserted.

Signed and sealed this 18th day of July 1972.

(SEAL)
Attest:

EDWARD M.FLETCHER,JR. ROBERT GOTTSCHALK
Attesting Officer Commissioner of Patents